(12) United States Patent
Collins et al.

(10) Patent No.: US 7,299,467 B2
(45) Date of Patent: Nov. 20, 2007

(54) METHOD AND SYSTEM FOR MINIMIZING MEMORY ACCESS LATENCY IN A COMPUTER SYSTEM

(75) Inventors: David L. Collins, Magnolia, TX (US); Steven R. Dupree, The Woodlands, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 758 days.

(21) Appl. No.: 10/328,440

(22) Filed: Dec. 23, 2002

(65) Prior Publication Data

US 2004/0123301 A1    Jun. 24, 2004

(51) Int. Cl.
G06F 9/46 (2006.01)
G06F 15/16 (2006.01)
G06F 15/167 (2006.01)
G06F 15/173 (2006.01)
G06F 15/00 (2006.01)
G06F 15/76 (2006.01)
G06F 9/00 (2006.01)

(52) U.S. Cl. .......................... 718/104; 718/102; 718/103; 709/201; 709/216; 709/217; 709/223; 709/226; 712/28; 713/1; 713/2; 713/100

(58) Field of Classification Search ........ 718/102–104; 709/201, 216, 223, 226, 217; 712/28; 710/36, 710/37; 702/179; 713/1–2, 100
See application file for complete search history.

(56) References Cited

U.S. PATENT DOCUMENTS

| | | | |
|---|---|---|---|
| 4,914,570 A * | 4/1990 | Peacock | 718/106 |
| 5,442,771 A * | 8/1995 | Filepp et al. | 709/219 |
| 5,517,662 A | 5/1996 | Coleman et al. | |
| 5,574,944 A | 11/1996 | Stager | |
| 5,594,910 A * | 1/1997 | Filepp et al. | 712/28 |
| 5,687,370 A | 11/1997 | Garst et al. | |
| 5,758,072 A * | 5/1998 | Filepp et al. | 709/220 |
| 5,924,116 A * | 7/1999 | Aggarwal et al. | 711/122 |
| 5,940,621 A * | 8/1999 | Caldwell | 717/156 |
| 6,026,415 A | 2/2000 | Garst et al. | |
| 6,065,058 A * | 5/2000 | Hailpern et al. | 709/231 |
| 6,085,193 A * | 7/2000 | Malkin et al. | 707/10 |
| 6,088,758 A | 7/2000 | Kaufman et al. | |
| 6,092,098 A | 7/2000 | Araki et al. | |
| 6,182,123 B1 * | 1/2001 | Filepp et al. | 709/217 |
| 6,304,884 B1 | 10/2001 | Garst et al. | |
| 6,421,713 B1 * | 7/2002 | Lamparter | 709/216 |
| 6,651,141 B2 * | 11/2003 | Adrangi | 711/118 |
| 6,779,030 B1 * | 8/2004 | Dugan et al. | 709/223 |
| 7,024,450 B1 * | 4/2006 | Deo et al. | 709/203 |
| 7,054,900 B1 * | 5/2006 | Goldston | 709/203 |
| 2002/0073167 A1 * | 6/2002 | Powell et al. | 709/217 |
| 2002/0091763 A1 * | 7/2002 | Shah et al. | 709/203 |
| 2002/0133537 A1 * | 9/2002 | Lau et al. | 709/203 |
| 2002/0165939 A1 * | 11/2002 | Terribile | 709/218 |
| 2003/0018960 A1 * | 1/2003 | Hacking et al. | 717/158 |

OTHER PUBLICATIONS

Kopp, Carlo, "Proxies and Performance," Dec. 2000, Carlo Kopp's Systems Publications, pp. 1-8.*

* cited by examiner

Primary Examiner—William Thomson
Assistant Examiner—Qing-Yuan Wu

(57) ABSTRACT

A computer system includes a plurality of nodes coupled together wherein each node may comprise a processor and memory. The system may also include a plurality of software objects usable by any of the nodes. Each object may be provided to, and stored in, the memory of the node that most frequently uses the object.

21 Claims, 1 Drawing Sheet

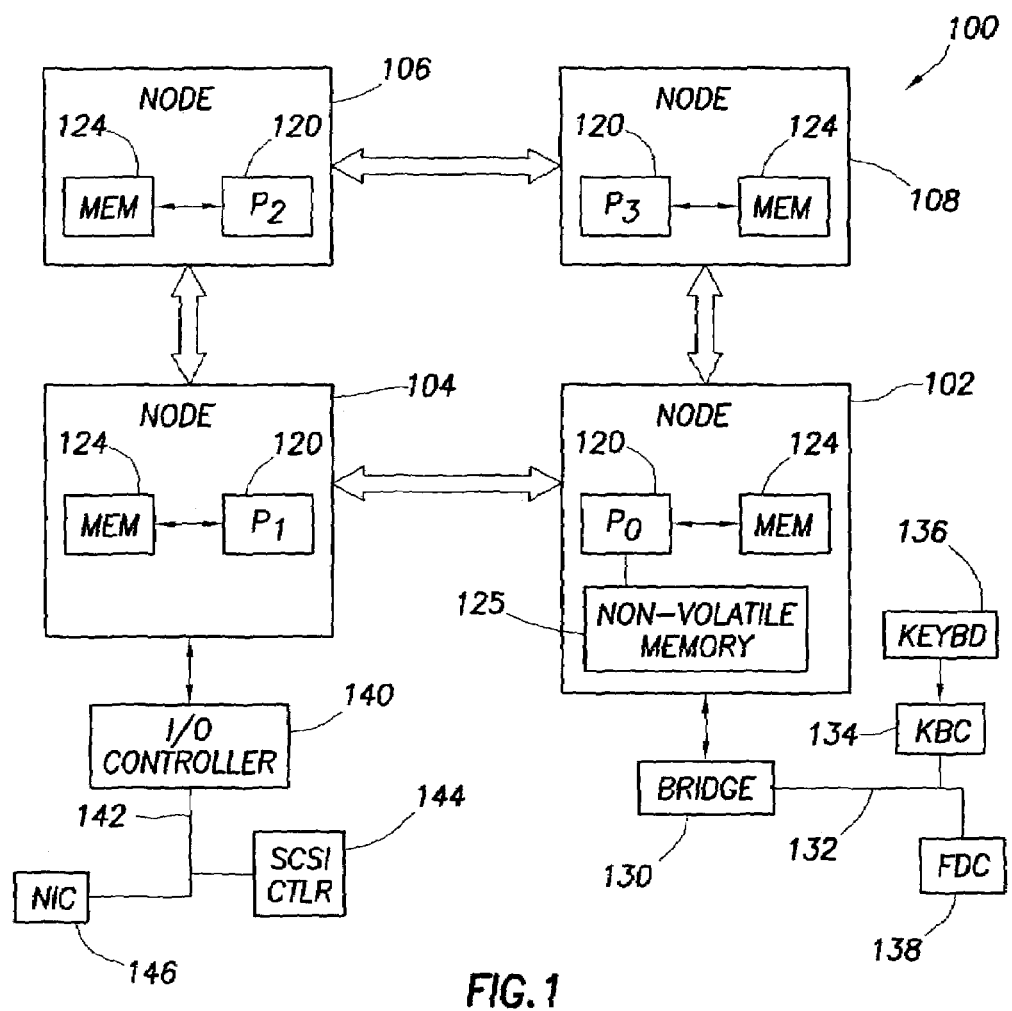
FIG.1
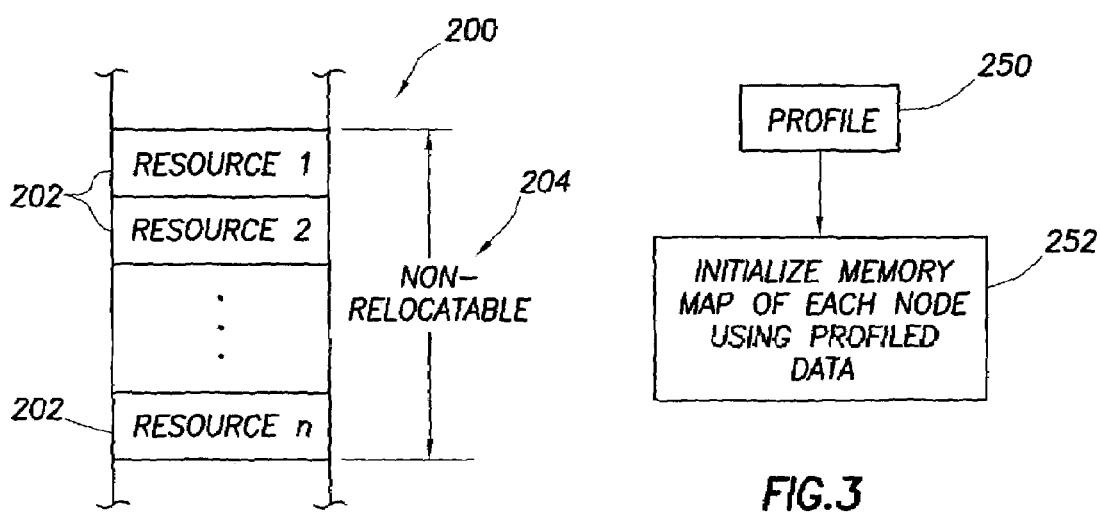
FIG.2
FIG.3

METHOD AND SYSTEM FOR MINIMIZING MEMORY ACCESS LATENCY IN A COMPUTER SYSTEM

BACKGROUND

1. Field of the Invention

The present invention generally relates to a computer system and more particularly to a multi-node computer system in which software objects are distributed across the various nodes according to their frequency of use.

2. Background Information

An operating system comprises executable code that provides an infrastructure on which application programs may run. Operating systems generally provide a variety of resources which application programs may access. Such resources may include memory allocation resources, graphics drivers, etc., and may generally be referred to as the operating system "kernel."

Part of the process of launching an operating system during system initialization involves loading the kernel in memory. For some operating systems, the kernel is loaded into a predetermined area of memory. That is, a pre-designated portion of memory is allocated for the operating system kernel. For such operating systems, that portion of memory allocated for the kernel is not relocatable and is the same region of memory each time the operating system is launched. Such an operating system may be referred to as being "zero-based, memory dependent."

Some computer system architectures include a plurality of inter-coupled "nodes" with each node comprising a processor, memory and possibly other devices. Each processor may access its own "local" memory (i.e., the memory contained in the processor's node) as well as the memory of other nodes in the system. The processor-memory combination in each node may be referred to as being "tightly coupled" in that it is much easier and faster for a processor to access its own local memory than the memory of other nodes. Accessing remote memory involves submitting a request through the network between nodes for the desired data, whereas accessing local memory does not require use of network communication resources and the associated latencies.

In a zero-based, memory dependent operating system in which the operating system kernel must be loaded in a pre-designated portion of the memory space, the kernel may be loaded into the local memory of a single node. The node containing the kernel thus has easy, rapid access to the kernel resources. Other nodes in the system also have access to the kernel, but not necessarily as rapidly as the node in which the kernel physically resides. Some nodes may be coupled directly to the node containing the kernel, while other nodes may not couple to the kernel's node via other intervening nodes. This latter type of node, which does not have a direct connection to the node containing the kernel, may be granted access to the kernel, but such requests and accesses flow through the nodes intercoupling the node needing the kernel and the node containing the kernel. Moreover, the latency associated with kernel accesses is exacerbated as the number of intervening nodes increases between the requesting node and the node containing the kernel. It is desirable to reduce latency in this regard.

BRIEF SUMMARY OF EMBODIMENTS OF THE INVENTION

One or more of the problems noted above may be addressed by a computer system that includes a plurality of nodes coupled together wherein each node may comprise a processor and memory. The system may also include a plurality of software objects usable by any of the nodes. Each object may be provided to, and stored in, the memory of the node that most frequently uses the object. Without limitation, various embodiments of the invention may comprise a single node that performs the functionality described herein, a computer system having a plurality of nodes, and an associated method.

BRIEF DESCRIPTION OF THE DRAWINGS

For a detailed description of the preferred embodiments of the invention, reference will now be made to the accompanying drawings in which:

FIG. 1 shows a system diagram of a multi-node processor system in accordance with embodiments of the invention;

FIG. 2 illustrates a memory map in which an operating system kernel may be mapped; and FIG. 3 shows an exemplary method of reducing latency in accordance with embodiments of the invention.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . .". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF EMBODIMENTS OF THE INVENTION

The following discussion is directed to various embodiments of the invention. Although one or more of these embodiments may be preferred, the embodiments disclosed should not be interpreted or otherwise used as limiting the scope of the disclosure, including the claims, unless otherwise specified. In addition, one skilled in the art will understand that the following description has broad application, and the discussion of any embodiment is meant only to be exemplary, and not intended to intimate that the scope of the disclosure, including the claims, is limited to these embodiments.

Referring to FIG. 1, a computer system 100 is shown in accordance with embodiments of the invention. The system 100 may include a plurality of nodes 102, 104, 106 and 108. Although four nodes 102-108 are shown in FIG. 1, any number of nodes may be included. As shown, each node couples to two adjacent nodes. Thus, node 102 couples to nodes 104 and 108, node 104 couples to nodes 102 and 106, node 106 couples to nodes 104 and 108, and node 108 couples to nodes 102 and 106. Other configurations are possible as well and included within the scope of this disclosure.

Each node 102-108 may include one or processors 120, labeled as "P$_0$"-"P$_3$" as shown. Each node may also include local memory 124 that is coupled to the processor contained in that node. The local memory 124 of each node is accessible by that node's processor and the processors of other nodes. Thus, each processor 120 may access the memory of all other nodes in the system. Each processor 120 may execute one or more applications. Each node may run the same or different applications as are run on other nodes.

The system 100 may include other devices as well. For example, node 102 may couple to bridge device 130 which provides a bus 132 to which other devices may couple. Such other devices may include, for example, a keyboard controller 134 coupled to a keyboard 136 and a floppy disk controller 138. Other and/or different devices may be coupled to the system 100 via bus 132 and bridge 130. Although the bridge 130 is shown coupled to node 102, the bridge may be coupled to another node if desired.

The system may also include an input/output ("I/O") controller 140 which provides a bus 142 to which one or more I/O devices may be coupled. Examples of such I/O devices may include a small computer system interface ("SCSI") controller 144 and a network interface card "NIC") 146. Other and/or different I/O devices may be coupled to the system 100 via bus 142 and I/O controller 140.

Referring now to FIG. 2, a memory map 200 is shown. In general, the memory map 200 includes the all of the local memories 124 in the system 100 and address ranges assigned to the local memories so that preferably no two memory locations have the same memory address. As explained previously, the operating system kernel may include various resources 202, labeled in FIG. 2 as RESOURCE 1, RESOURCE 2, . . . , RESOURCE n, which are mapped to a non-relocatable and pre-designated portion 204 of memory.

Referring to FIGS. 1 and 2 and in accordance with various embodiments of the invention, the resources comprising operating system kernel may be distributed across two or more nodes 102-108 in a way so as to reduce the latency associated with inter-node kernel accesses. A variety of embodiments may be possible for accomplishing this result. One exemplary embodiment involves allocating the kernel's resources 202 to the nodes that typically have a greater need for such resources. For example, one node out of the plurality of nodes 102-108 may run an application that uses a particular kernel resource 202 more often than the other nodes. That being the case, that particular resource 202 may be provided to the node most often needing the resource for storage in that node's memory 124. Further, each resource may be assigned to the node that history as shown most frequently needs the resource. The memory map 200 may remain the same as in conventional systems. That is, the memory map 200 will still list the kernel resources 202 as being located in the pre-designated region of memory 204. However, the kernel resources 202 identified in the memory map 200 may be distributed among the various nodes 102-108 in a manner that takes advantage of the frequency of use of such resources among the various applications that run on the nodes 102-108.

Referring now to FIG. 3, a method of implementing this feature may include blocks 250 and 252. In block 250, a profile of use of the kernel resources 202 is generated. This profiling act may include tracking the frequency of use of each kernel resource by each of the various applications running on the various nodes in the system 100. This act can be accomplished by any suitable technique such as statistical sampling software (i.e., VTUNE-Intel). In some embodiments, a boot strap processor ("BSP") node may perform the act of profiling. In general, the boot strap processor node may be responsible for initializing the system 100 and launching the operating system, as well as profiling kernel resource usage in accordance with the preferred embodiment. In general, any node, such as node 102, may function as the BSP, but typically one node is predetermined to be the BSP, or a BSP selection algorithm may be implemented during initialization. Profiling may occur continuously during run-time or at predetermined discrete times. The profiling results generally may include a frequency of use distribution of the various resources with the various applications that may run on the nodes 102-108. The results of the act of profiling kernel resource usage may be stored in a file in non-volatile memory 125 on the boot strap processor node, which may be node 102 as shown. The non-volatile memory 125 may be coupled to the processor 120 and may comprise a suitable type of read only memory ("ROM"), such as electrically erasable read only memory ("EEPROM"), battery backed-up random access memory ("RAM"), or other suitable type of storage medium. Further, the non-volatile memory 125 may be pre-loaded with a default profile data file. Then, during normal system operation, the default profile data file may be updated with new profiling results according to the particular operation of the system 100.

Referring to FIGS. 1 and 2 and in accordance with various embodiments of the invention, the resources associated with the operating system kernel may be distributed across two or more nodes 102-108 in a way so as to reduce the latency associated with inter-node kernel accesses. A variety of embodiments may be possible for accomplishing this result. One exemplary embodiment involves allocating the kernel's resources 202 to the nodes that typically have a greater need for such resources. For example, one node out of the plurality of nodes 102-108 may run an application that uses a particular kernel resource 202 more often than the other nodes. That being the case, that particular resource 202 may be provided to the node most often needing the resource for storage in that node's memory 124. Further, each resource may be assigned to the node that history as shown most frequently needs the resource. The memory map 200 may remain the same as in conventional systems. That is, the memory map 200 will still list the kernel resources 202 as being located in the pre-designated region of memory 204. However, the kernel resources 202 identified in the memory map 200 may be distributed among the various nodes 102-108 in a manner that takes advantage of the frequency of use of such resources among the various applications that run on the nodes 102-108.

It is possible that an application that runs on two or more of the nodes 102-108 may have an approximately equal frequency of use of a particular kernel resource. In this case, the resource may be loaded on any of such nodes. The frequency of use of other nodes may also be considered. For example, two nodes may run applications that result in an approximately equal frequency of use of a particular kernel resource. While both nodes may have an approximately equal use of a particular resource, a third node may have a substantial (albeit lower) need for the same resource. With regard to FIG. 1, for example, nodes 106 and 108 may have an approximately equal frequency of use of a particular resource 202, and node 104 may require the same resource, but less often. In this case, the resource may be provided to node 106, rather than node 108. In that way, node 104 need only incur a one node "hop" to node 106 to acquire the necessary resource. If, instead, the resource 202 had been provided to node 108, node 104 would have had to incur a two node hop through node 106 to acquire the resource from node 108.

The preferred embodiments permit a more efficient distribution of operating system kernel resources in a multi-node computer system, thereby advantageously reducing latency. The above discussion is meant to be illustrative of the principles and various embodiments of the present invention. Numerous variations and modifications will become apparent to those skilled in the art once the above disclosure is fully appreciated. For example, although the resources comprising the operating system kernel are described as being distributed across the various nodes, in general, any type of memory-based object may be distributed as described above. Without limitation, such objects may include statically located system environment variables. It is intended that the following claims be interpreted to embrace all such variations and modifications.

What is claimed is:

1. A computer system, comprising:
a plurality of nodes coupled together, each node comprising a processor and memory; and
a plurality of software objects usable by any of the nodes;
wherein one of the plurality of nodes determines which of the plurality of nodes most frequently uses each object;
wherein, based on said determination, each object is provided to and stored in the memory of a single node that most frequently uses the object so that all other nodes when needing said object access said single node in whose memory the object is stored;
wherein each software object is stored in only one of said plurality of nodes at a time.

2. The computer system of claim 1 wherein one of said nodes comprises a boot strap processor that determines to which node to provide and store each software object.

3. The computer system of claim 2 including a plurality of applications that run on the nodes, each application capable of running on one or more nodes, and the boot strap processor includes profile data that is indicative of a frequency of use of each software object by the plurality of applications, and wherein the boot strap processor determines to which node to provide and store each software object by retrieving and examining said profile data.

4. The computer system of claim 1 wherein a software object may be used equally by first and second nodes and to a lesser degree by a third node that is connected to one of said first or second nodes, and said object is provided to the one of said first and second nodes that is connected to said third node.

5. The computer system of claim 1 including a plurality of applications that run on the nodes, each application capable of running on one or more nodes, and at least one of said nodes includes profile data that is indicative of a frequency of use of each software object by the plurality of applications.

6. The computer system of claim 5 wherein said profile data is generated during run-time of said computer system.

7. The computer system of claim 5 wherein said profile data comprises a predetermined data set.

8. The computer system of claim 5 wherein said profile data comprises a plurality of software objects and a frequency of use of each object with an application that runs on one or more nodes.

9. The computer system of claim 1 wherein said software objects comprise operating system kernel resources.

10. A computer node operable in a system comprising a plurality of computer nodes and a plurality of operating system kernel resources, said computer node comprising:
a processor;
memory coupled to said processor and containing profile data that identifies which computer node most frequently uses each operating system kernel resource;
wherein said processor, for each operating system kernel resource and based on said profile data, provides said kernel resource to a single computer node that most frequently uses said kernel resource so that all other computer nodes, when needing said operating system kernel resource, access said single computer node to which the operating system kernel resource is provided;
wherein each kernel resource is stored in only one of said plurality of computer nodes at a time.

11. The computer node of claim 10 wherein said node comprises a boot strap processor that determines to which node to provide and store each operating system kernel resource.

12. The computer node of claim 11 further comprising a boot strap processor.

13. The computer node of claim 10 wherein an operating system kernel resource may be used equally by first and second nodes and to a lesser degree by a third node that is connected to one of said first or second nodes, and said processor provides said resource to the one of said first and second nodes that is connected to said third node.

14. The computer node of claim 10 wherein said system includes a plurality of applications that run in the system, each application capable of running on one or more nodes, and said profile data is indicative of the frequency of use of each operating system kernel resource by the plurality of applications.

15. The computer node of claim 14 wherein said profile data is generated during run-time.

16. The computer node of claim 14 wherein said profile data comprises a predetermined data set.

17. The computer node of claim 14 wherein said profile data comprises a plurality of operating system kernel resources and a frequency of use of each resource with an application that runs on one or more nodes.

18. A method, comprising:
(a) obtaining profile data that identifies, for each of a plurality of software objects, a node from among a plurality of nodes that most frequently uses each such software object;
(b) determining which node runs an application that uses a particular software object more frequently than another node from said plurality of nodes that runs said application;
(c) based on said determination, copying the software object to a single node that runs the application that uses the software object more frequently than said another node so that said another node accesses said software object from the single node to which the software object was copied; and
(d) repeating (b) and (c) for additional software objects;
wherein each software object is stored in only one of said plurality of nodes at a time.

19. The method of claim 18 further including generating said profile data and storing said profile data in a node in the multi-node system.

20. The method of claim 19 wherein (b) includes determining a plurality of nodes that use the particular software object equally and (c) includes copying the software object to one of said plurality of nodes that use the particular software object equally.

21. The method of claim 20 wherein (c) includes copying the software object to one of said plurality of nodes that use the particular software object equally and that connects to a different node from said plurality of nodes that uses the software object, albeit less frequently than said plurality of nodes that use the particular software object equally.

* * * * *